3,409,404
ANALYTICAL METHODS AND DEVICES EMPLOYING CHOLESTERIC LIQUID CRYSTALLINE MATERIALS
James L. Fergason, Verona, Pa., assignor to Westinghouse Electric Corporation, Pittsburgh, Pa., a corporation of Pennsylvania
Filed Nov. 13, 1963, Ser. No. 323,341
19 Claims. (Cl. 23—230)

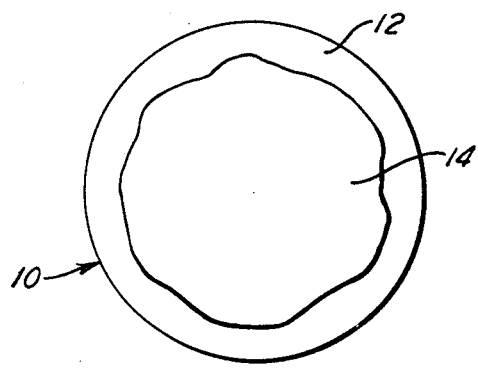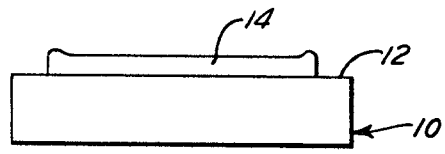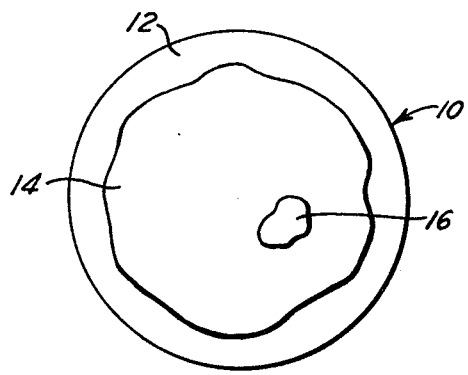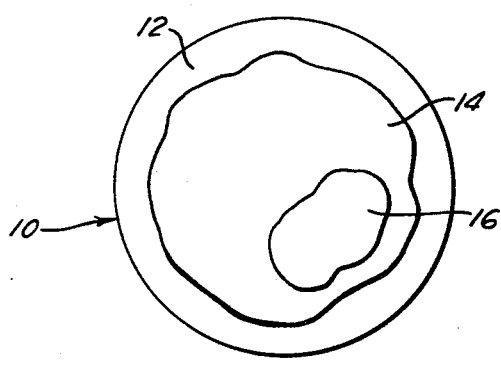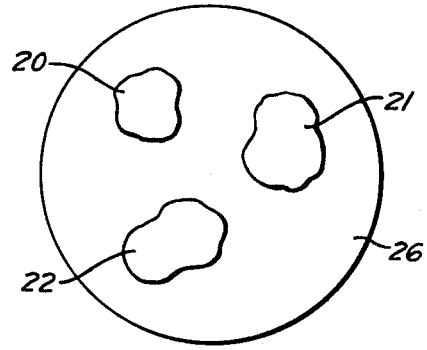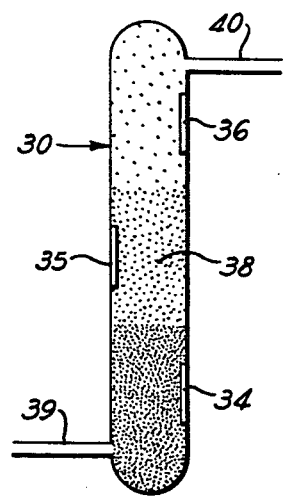

ABSTRACT OF THE DISCLOSURE

The optical properties of a chloresteric liquid crystalline material are changed when the cholesteric material is contacted with another material. A variety of materials, particularly vapors, are identified by observing their effect on cholesteric liquid crystalline materials. The most convenient observable effect is a change in the color of the cholesteric material and, if necessary, comparing the change to the change effected by a known standard material. An analytical device may comprise one or more distinct elements of cholesteric liquid crystalline material. Suitable cholesteric liquid crystalline materials include a wide variety of compounds, and mixtures thereof, derived from cholesterol.

---

This invention relates to the detection and analysis of matter, for example, gases and in particular concerns methods, articles of manufacture and apparatus particularly adapted to analysis on a qualitative and quantitative basis.

It is a primary object of the present invention to provide a novel method of analysis of both a quantitative and qualitative nature, that is easily practiced, and is highly sensitive to small concentrations of the materials to be detected.

Another object of the invention is to provide a novel method of identifying an unknown material.

It is a further object of the invention to provide a method in which an unknown is brought into contact with a new detector material and the character and amount of the unknown are indicated upon observing an optical change in the system contacted.

An additional object of the invention is to provide a novel detector, responsive by changes in an optical property brought about by contact of the detector with an unknown material.

Other and further objects will be apparent from the following detailed description and discussion of the invention.

Liquid crystalline materials have properties that are intermediate those of a true liquid and a true crystal since they have an ordered structure while also having fluidity. Liquid crystalline materials are also referred to as materials in the mesomorphic state. Liquid crystalline materials are known and are characterized or identified by one of three phases or structures. One is the smectic structure, which is characterized by its molecules being arranged in layers with the long axis approximately normal to the plane of the layers. The second is the nematic structure, which is characterized by thread like molecules that tend to be and remain in nearly parallel orientation. The third is known as the cholesteric phase the molecular configuration of which has not yet been determined. The present invention is concerned with materials exhibiting a cholesteric liquid crystalline phase.

The cholesteric phase has certain characteristics which are markedly different from either the smectic or the nematic phase. The characteristic properties of the cholesteric structure may be summarized as follows: (1) It is optically negative, while smectic and nematic structures are optically positive. (2) The structure is optically active. It shows strong optical rotatory power. (3) When illuminated with white light, the most striking property of the cholesteric structure is that it scatters light selectively to give vivid colors. A cholesteric material exhibits a scattering peak having a bandwidth of about 200 angstroms that occurs in or between the infrared and ultraviolet portions of the spectrum. (4) In the cholesteric structure, one circular polar component of the incident beam is completely unaffected. For the dextro cholesteric structure, it is only the circular polarized beam with counter-clockwise rotating electric vector which is reflected. (The sign of rotation refers to an observer who looks in the direction of the incident light.) Levo cholesteric structures have the reverse effect. (5) When circular polarized light is scattered from these materials, the sense of polarization is unchanged. In ordinary materials, the sense of circular polarization is reversed. (6) The mean wave length of the reflection band depends upon the angle of incidence of the beam. The relationship can be roughly approximated by the Bragg diffraction equation for a birefringent material. These enumerated properties effectively define cholesteric liquid crystals. A review of existing knowledge of liquid crystalline materials is found in an article by G. H. Brown and W. G. Shaw entitled "The Mesomorphic State—Liquid Crystals," Chemical Reviews, v. 57, No. 6, December 1957, beginning on p. 1049.

It has now been discovered, and it is on this discovery that the present invention is in large part predicated, that gases, liquids and solids can affect the structure of cholesteric liquid crystals so that one or more optical properties thereof is at least temporarily changed. It has further been discovered that, upon providing a comparable basis, the resultant change is specific for the unknown involved which is thereby determined. By utilizing these general principles an utterly new mode of analysis is provided.

The optical property most readily utilized in the practice of this invention is that of selective scattering since it requires no polarizers or analyzers for observation. As beforementioned, each cholesteric liquid crystal, at a given temperature and composition, exhibits, when exposed to white light, a scattering peak. In accordance with this invention, the shift in the scattering peak may be utilized for the analysis of unknown materials since the direction of shift is a qualitative indication of the unknown and the extent of shift is an indication of the quantity of the unknown. However, it is also possible to utilize changes in other optical properties of the liquid crystals.

For example, it has also been found that the circular dichroism and optical rotation of cholesteric materials are similarly affected by foreign matter. The component of circularly polarized light that is affected by the cholesteric material has a waveband of minimum transmission. This waveband shifts in the same direction and to the same extent as the scattering peak. Similarly, the waveband of peak optical rotation exhibits such a shift. Since cholesteric liquid crystalline materials have negligible optical absorption, the transmitted radiation may be utilized for the purposes of this invention as well as the scattered radiation.

In general, a material that is at least partially intersoluble with the cholesteric liquid crystalline material will affect the optical properties of the liquid crystal in a reversible manner. Also it is the case that a material that chemically reacts with the cholesteric liquid crystalline material will affect its optical properties in an irreversible manner. In instances in which the effect is reversible, the liquid crystal provides an optical indication of the nature and quantity of the foreign material present at that instant. Because of the reversible nature of the effect, the liquid crystal may be continually reused. In instances in which the effect is irreversible, the liquid crystal provides an optical indication of the same type that is cumulative. Hence, each type of effect has advantageous applications and the present invention is concerned with both reversible and irreversible effects.

The present invention permits identification of a variety of materials by reason of their affect on cholesteric liquid crystalline materials. For example, reversible effects on the liquid crystal optical properties have been observed with common organic solvents, amines, simple alcohols and organic acids while irreversible effects have been observed with halogens, oxidizing agents, alcohols, amines, acids, bases and reducing agents.

By way of example and more specifically in accordance with this invention, vapors or gases are detected and determined by contact thereof with a cholesteric liquid crystal. In instances, this contact results in a chemical reaction that is irreversible. Consequently, there is brought about a change in the contacted liquid crystal so that the resultant material (vapor plus crystal) has different optical properties from the original or uncontacted cholesteric liquid crystal and these optical properties can be measured. Moreover, the change, being irreversible, remains and the contact of additional vapor "adds" thereto or is cumulative, and this may be employed for quantitative determination of the gas involved. By measuring the resultant optical properties and comparing these with standards, it is possible to determine, in this simple fashion, the specific gas brought into contact with the cholesteric liquid crystal as well as the amount thereof.

The absorption of certain gases in the cholesteric phase has an influence on the forces existing within that phase. For example, gas absorption can affect the packing forces within the crystal. These changes are converted to changes in optical characteristics, for example color changes. Moreover since these are specific for the particular gas involved and the material used in the cholesteric phase, there is provided an easily used detection system even in the absence of permanent change.

The manner by which contact or interaction of the unknown and the liquid crystal is brought about may be determined largely by the state of the unknown. For example, simply exposing the cholesteric liquid crystal to the vapor or gas has been sufficient, for the gas readily permeates the crystal, changing its optical properties. A great number of laboratory determinations have been made as follows: A liquid crystal was disposed on a suitable substrate or holder, for example a plastic or glass surface, the crystal being of any diameter but usually 2 or 3 inches and 5 to 200 microns thick. Then materials to be tested, which very regularly were common laboratory liquid reagents, were brought close to the crystal. In the usual instance with, for example, chloroform, a bottle containing it would be unstoppered and held in tilted position so that vapor in the bottle above the liquid therein could flow to the surface of the crystal. Vapors of chloroform are heavier than air and therefore readily flow downwardly. For gases that are lighter than air, conditions of upward flow can be used. Another convenient procedure is to project the gas to the crystal surface, for example by using a syringe or similar means. For more complex practice as, for example, in using the discovery to monitor a room, a chemical reaction or the like, other arrangements to secure the necessary contact may be used. In instances such practice may involve applying heat, or using shielding means, or other conditions that may be determined by the circumstances encountered in use and the liquid crystal that is to be used.

As already noted each cholesteric liquid crystal is unique, and the response to any given material will be unique in the change wrought in optical properties. The speed with which these changes occur also differ substantially in many of the crystals. In instances, the gas permeating the crystal causes a vivid color change in but seconds, or fractions of seconds. With the reversible systems, the effect usually dissipates almost as rapidly, apparently as the volatile gas diffuses back to and through the atmosphere. Other cholesteric liquid crystals appear to have a "memory" and the result brought about by, for example, solubilization of gas therein may remain at least partially for periods of hours apparently due to the formation of relatively weak bonds in the liquid crystal.

Where the unknown to be determined is in the liquid or solid state, contact with the cholesteric liquid crystal material generally differs from that employed with gaseous unknowns. In these instances, it is useful to incorporate the unknown liquid or solid in the liquid crystal material while the latter is dissolved in a suitable solvent. Thereupon, the resulting mixture can be poured to the substrate. When the solvent evaporates, there remains the liquid crystal having incorporated therein the added unknown, either by reaction with the crystal or by being dissolved therein. Since the resulting cholesteric liquid crystal is intrinsically different from that which would result from the liquid crystal material solution alone, i.e. without the unknown added to the solution. It will be evident from what has already been said that the resulting optical properties, for example color, also will be different, with the change being characteristic of the unknown employed. Further, because each cholesteric liquid crystal is itself unique, the change brought about by a given unknown will be unique in each different crystal.

In addition to contact or interaction of a gas, liquid or solid with a cholesteric liquid crystal, mixtures can be used. Accordingly, two or more gases or liquids or solids may be used with a liquid crystal composed of two or more cholesteric liquid crystals. Much information has already been determined with binary and ternary cholesteric liquid crystals, and of course even more complex cholesteric liquid crystals can be used. Mixtures can be employed to obtain properties, such as sensitivity or breadth of operability or the like, that may be inconvenient or uneconomic to attain by a single cholesteric liquid crystal.

For use in the present invention, the cholesteric liquid crystals can be disposed on any desired support and in any desired configuration. The support can be a plastic, glass, metal or the like. A film of polyethylene terephthalate that is blackened on one side has been found to be useful. The nature of the blackening material is not at all critical since the liquid crystalline material need not be in contact with it. Frequently, the crystals are prepared by simply pouring a solution thereof to the substrate, and allowing the solvent to evaporate. That generally results in a more or less circular crystal having a diameter dependent largely on the quantity of material used. Such circular crystals normally are of substantially uniform thickness over most of their area and have thicker zones towards the edges. They can be used as such, or trimmed to some other desired size. For some purposes part or all of the crystal can be given a regular shape, as by trimming, and then be transferred to other locations or substrates by careful stripping from their zone of deposition. Neither shape nor thickness has been found to be critical in the present invention. However, for standardization purposes, it is useful to employ crystals of uniform size and shape. A thickness of about 5 to 200 microns has been found to be satisfactory, but thicker or thinner crystals can be used as well. With thin crystals, it is possible to use transparent supports and substrates and observe, visually or by measurement, changes through the substrate.

The detector element, comprising the substrate and the cholesteric liquid crystalline material, may be disposed for use in numerous suitable ways. For some purposes, it is advantageous to employ an adhesive backing on the substrate to permit application of the detector element to another object in any desired position. In instances in which the substrate is a flexible member, the detector may be formed as a tape thus permitting it to be disposed for its end use even on non-planar surfaces.

The active or operational detector element of this invention is the cholesteric liquid crystal. As is known, the term cholesteric has been used because this state is exhibited by compounds derived from cholesterol. Whereas those derivatives constitute the most substantial class of known compounds exhibiting the cholesteric liquid crystalline phase, that phase is by no means limited thereto and, of course, cholesteric liquid crystals without regard to chemistry can be employed in the present invention.

Cholesteric liquid crystalline materials which are suitable for use in the invention include derivatives of delta-5-cholestene 3-beta amino as well as compounds derived from cholesterol. Some examples of suitable materials include mixed esters of cholesterol and inorganic acids such as cholesteryl chloride, cholesteryl bromide, cholesteryl nitrate, etc.; organic esters of cholesteryl such as cholesteryl crotonate, cholesteryl nonanoate, cholesteryl formate, cholesteryl acetate, cholesteryl propionate, cholesteryl valerate, cholesteryl hexanoate, cholesteryl docosonoate, cholesteryl vaccenate, cholesteryl chloroformate, cholesteryl linolate, cholesteryl linolenate, cholesteryl oleate, cholesteryl erucate, cholesteryl butyrate, cholesteryl caprate, cholesteryl laurate, cholesteryl myristrate, and cholesteryl clupanodonate, etc.; ethers of cholesterol such as cholesteryl decyl ether, cholesteryl lauryl ether, cholesteryl dodecyl ether, etc.; carbonates and carbamates of cholesterol such as cholesteryl decyl carbonate, cholesteryl methyl carbonate, cholesteryl ethyl carbonate, cholesteryl butyl carbonate, cholesteryl docosonyl carbonate, cholesteryl cetyl carbonate, cholesteryl oleyl carbonate, cholesteryl heptyl carbamates, etc.; alkyl amides and aliphatic secondary amines derived from 3-beta-amino delta-5-cholestene, the corresponding esters noted above of cholestanol, etc. The corresponding derivatives of beta sitosterol as well as active amyl ester of cyano benzilidene amino cinnamate are effective.

The alkyl portion of the above compounds comprises at least one compound selected from the group consisting of saturated and unsaturated fatty acids and alcohols having from 1 to 27 carbon atoms per molecule, the unsaturated members having from 1 to 6 olefinic groups per chain. Aryl substituents generally comprise a single benzene ring that may have one or more lower alkyl groups attached thereto.

The foregoing compounds exhibit a cholesteric liquid crystalline state over a given range of temperature. These temperature ranges in instances are small, and large in other instances for the list of materials given, the temperatures may be as low as about minus 20° C. to as high as about 250° C. The determination of the range for each material is easily made by heating the compound (or mixture) and noting the appearance of turbidity or possibly a color. After a further rise and at a definite temperature, the material clears to a true liquid and is no longer in the cholesteric liquid state. Upon cooling from the true liquid state, the action is reversed, though supercooling may depress the first noted temperature. The consistency of the various materials may range from a thick paste to a freely flowing liquid, while in the liquid crystalline state. The materials can be used in this state. Some suitably are dissolved in a solvent, for example, chloroform, ether, benzene, petroleum ether, carbon tetrachloride, common saturated hydrocarbon mixtures such as kerosene, and carbon disulfide, or other common organic solvents, and then poured to a film from which the solvent evaporates. These films frequently can be separated from the support and located where desired.

Accordingly, each of the materials used in this invention has a characteristic temperature range at which it is to be used. For example, cholesteryl caprate exhibits the phase from 82° to 89° C.; for cholesteryl myristrate, the range is 78° to 83° C.; for cholesteryl cinnamate, the range is about 161° to 197° C.; for cholesteryl propionate, the range is about 98° to 113° C.; for cholesteryl nonanoate, it is 79° to 90° C.; for cholesteryl arachidonate, the liquid crystalline phase occurs below 0° C.; for cholesteryl p-nitro benzoate, the liquid crystalline phase occurs in the range from about 189° C. to 250° C. at which latter temperature it decomposes. Many mixtures of compounds forming the cholesteric liquid crystalline state form cholesteric liquid crystal phases at room temperature and below. Considering the compounds and mixtures as a whole, detectors are thus now available to operate for ranges of 5° to 100° C. at any center temperature of minus 20° C. to in excess of 150° C. As is apparent, in using these materials in this invention, the materials will be used at the appropriate temperature to secure the cholesteric liquid crystalline phase.

Many of the foregoing compounds are available commercially, having substantial commercial uses. Others are disclosed in the literature to which reference can be made for details of preparations as well as general properties. Some methods of synthesis found to be especially useful are as follows: Cholesteric liquid crystals comprising carboxylic acid esters of cholesterol can be prepared by heating cholesterol and a carboxylic acid to the boiling point of the acid, or, in the case of high molecular weight acids, to about 200° C. After thorough reaction, the mixture is cooled to handling temperature. Cholesterol and carboxylic acids can also be made to react in a benzene solution or in other volatile hydrocarbon solvent upon the addition of a catalyst, for example, para-toluene sulfonic acid. Another useful method comprises reaction of an acyl halide with cholesterol in the presence of a suitable proton acceptor, for example pyridine or analogous compound. This latter reaction can be performed in the presence of a solvent if desired though none is needed.

Using the latter process, cholesterol and pyridine can be dissolved in equal amounts in benzene. The acyl chloride being used is also dissolved in a similar amount of benzene and in a like molar quantity. Then this latter solution is added dropwise to the cholesterol-pyridine-benzene solution. The reaction proceeds spontaneously, usually with the evolution of heat and the formation of a fine white precipitate of pyridine hydrochloride. After complete addition of the acyl chloride, the mixture is refluxed for about one hour to insure complete reaction. Then the mixture is cooled to room temperature, the precipitate is filtered, washed with benzene and discarded. The filtrate and washings are then treated with a lower alkyl alcohol, for example methyl or ethyl alcohol. Crystallization is promoted by slow addition of the alcohol while constantly stirring. Recrystallization can be practiced to obtain the pure product. Cholesteryl alkyl or aryl carbonates can be readily made by first reacting phosgene with cholesterol, and reacting the product with the appropriate alcohol, in the presence of a proton acceptor, to produce the mixed ester carbonate. Suitably a solvent such as benzene is used as the reaction medium. Other suitable methods of synthesis can be used as desired.

Reference will now be made to the attached drawing, in which:

FIGURE 1 shows, in elevation, a cholesteric liquid crystal disposed on a substrate;

FIG. 2 is a top view of FIG. 1;

FIG. 3 shows, diagrammatically, a top view as in FIG. 2 and the effect of allowing a vapor to permeate part of the liquid crystal;

FIG. 4 is a second view corresponding to that of FIG. 3 showing further permeation by the added vapor;

FIG. 5 is a top plan view of an array of cholesteric liquid crystals to be used in accordance with the invention;

FIG. 6 is a representation of a packed column having cholesteric liquid crystals disposed vertically along the inside surface of the column.

Figure 7:
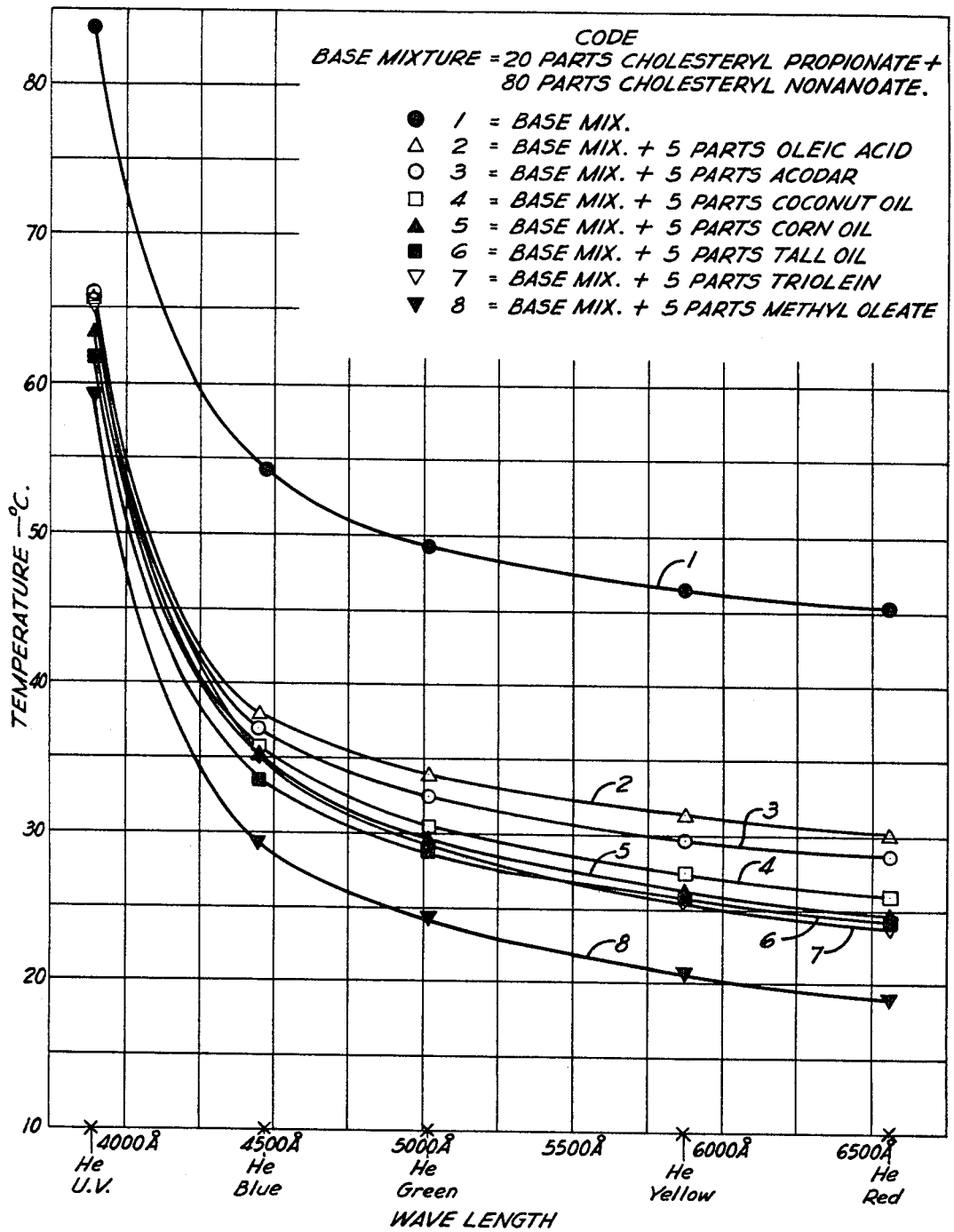
FIG. 7 is a graph of data of the temperature versus wave length characteristics of a cholesteric liquid crystal to which various oils have been added.

Referring now to the drawing, numeral 10 indicates a support or substrate member upon which a cholesteric liquid crystal can be deposited and supported. Generally, the criterion for the use of any material as a substrate is only that it not interfere, as by reacting with the crystal that is to be deposited thereon or masking the optical properties of the crystal. Typical materials that have been used include halogenated hydrocarbon resins such as polytetrafluoroethylene, polyethylene terephthalate and the like, glass, methyl methacrylate resins, ceramics generally, etc. The substrate 10 may be any thickness desired. In instances where transparent substrates are used, it may be useful to limit the thickness so that the substrate does not contribute unnecessary scattering of light that may be employed. On the upper surface 12 of the substrate 10 is shown a cholesteric liquid crystal 14. As is evident from the wide number of materials that have a cholesteric liquid crystalline phase and therefore can be used in the invention, it will be evident that a wide variety of ways of applying the liquid crystal to the substrate is possible. For example, the crystal can be cast thereon, "buttered thereon," applied from a dropper, painted, sprayed or otherwise applied. A quite common method of application is to pour a solution containing the liquid crystal thereon and allow the solvent to evaporate.

When the crystal is deposited from a solvent as just indicated, an irregular shape normally occurs and such is shown in the top view thereof in FIG. 2. In FIG. 2, the irregular shape 14 is the cholesteric liquid crystal and the circular shape 12 is the surface of the substrate 10.

As noted hereinbefore optical properties, such as color, of a liquid crystal change when a vapor is allowed to permeate the crystal. In FIG. 3, there is shown a small irregular shape 16 within the irregular shape 14 which constitutes the liquid crystal supported on the surface 12 of the substrate 10. The irregular shape 16 constitutes a color area brought about by permeation by a vapor into the cholesteric liquid crystal 14. As more of that vapor is added, the irregular shape 16 expands correspondingly as is shown at 16 in FIG. 4.

Since each liquid crystal is distinct and its reaction or response to an unknown is distinct, an array of liquid crystals can be devised to give an immediate determination of the unknown. Such an array is shown in FIG. 5. Thus three distinct liquid crystals 20, 21 and 22 are supported on a substrate 26. The liquid crystals being of known characteristics and known response to a given vapor, can be simultaneously exposed to an unknown vapor. Observation of all crystals will, upon comparison with standard information, indicate through optical change the identification of the unknown. Of course, such an array need not be limited to three cholesteric liquid crystals, but any larger or smaller number of crystals can be used as well.

As indicative of the results that can be achieved in accordance with the present invention, the following demonstration was made: All percents given are by weight. Ten liquid crystalline compositions were made, each consisting of a mixture of cholesteryl chloride and cholesteryl nonanoate. The amount of cholesteryl chloride in the compositions varied from 18% to 30%. Films, of substantially uniform thickness, of each composition were made by mixing the constituents in a solvent of 20% chloroform and 80% petroleum ether. The solutions were poured on polyethylene terephthalate film having a black coating on the opposite surface formed by spraying with a black acrylic lacquer available under the name "Krylon" from Krylon, Inc., Norristown, Pennsylvania. The solvent was then permitted to evaporate. Each film was then exposed, at 27° C., to a group of common organic solvents including acetone, butyl acetate, benzene, chloroform, trichloroethylene, n-heptane and pyridine. The solvent concentration varied from about 1 part per thousand to about 50 parts per million. The concentration was sufficient to produce color changes readily apparent to the human eye. Where no color change was observed, the detecting element eventually became colorless due to a phase change. These solvents reversibly affected the film color (i.e., the scattered waveband with the film exposed to white light) in the following manner:

PERCENT CHOLESTERYL CHLORIDE IN CHOLESTERYL NONANOATE

| Solvents | 18% | 19% | 20% | 21% | 22% | 23% | 24% | 25% | 27% | 30% |
|---|---|---|---|---|---|---|---|---|---|---|
| Acetone | Red to blue. | Red to green. | Green to blue. | Green to slightly red. | Green to slightly red. | Green to slightly red. | Green to slightly red. | Green to slightly red. | Green to slightly red. | Red (no change). |
| Butyl acetate | do | Red to blue. | do | Green to blue. | Green to blue. | Green to blue. | Green to blue. | Green (no change). | Green to red. | Do. |
| Benzene | do | do | do | do | do | Green (no change). | Green (no change). | Green to red. | do | Do. |
| Chloroform | do | do | Green to red. | Green to red. | Green to red. | Green to red. | Green to red. | do | do | Do. |
| Trichloroethylene | do | do | Green to blue. | Green to blue. | do | do | do | do | do | Do. |
| N-heptane | do | do | do | do | Green to blue. | Green to blue. | Green to blue. | Green to blue. | Green to blue. | Red to blue. |
| Pyridine | do | do | do | Green to red. | Green to red. | Green to red. | Green to red. | Green to red. | Green to red. | Red (no change). |

The data in the table illustrates that each solvent had a unique effect on the set of ten liquid crystals. Thus if an unknown solvent of the group described were exposed to the set of liquid crystals, it could be readily identified. For example: acetone is unique in producing a red to green shift in the 19% crystal; butyl acetate is unique in producing no change in the green color of the 25% crystal; benzene is unique in causing no change in the green color of the 23% or 24% crystals; chloroform is unique in producing a green to red shift in the 20% crystal; trichloroethylene is unique in producing different effects in the 21% crystal (green to blue) and the 22% crystal (green to red); n-heptane is unique in turning all of the liquid crystals blue; and pyridine is unique in producing a green to red shift in the 21% crystal that is readily distinguished from the slightly red appearance of that crystal when exposed to acetone.

Consequently, an array of the seven compositions having from 19% to 25% cholesteryl chloride in cholesteryl nonanoate permits the specific identification of the above-mentioned seven solvents.

The foregoing demonstrates the feasibility of forming an array of cholesteric liquid crystals that have a unique pattern in response to any of the materials that alter the optical properties of the liquid crystals, thus providing a "fingerprint" of each of those materials.

Another application of this invention is in gas chromatography, to which reference can be made in conjunction with FIG. 6. There a vertically disposed transparent tube 30 can be adapted to have a plurality of liquid crystals of predetermined composition along its inside surface. In the embodiment shown three liquid crystals 34, 35 and 36 are used, though any other number could be employed. Within the tube 30 is a mass of gas absorbents 38. At its lower end, tube 30 is provided with a gas inlet 39 and a gas outlet 40 extends from the upper end of the tube. Upon passing a gas into the system, it is absorbed on the absorbent until the latter is saturated, at which time it passes onwardly. By appropriate placement of specified liquid crystals lengthwise or vertically along the tube 30, the effective absorbency, or more correctly the failure to absorb possibly due to saturation, is promptly indicated because the gas would pass by that portion of the absorbent, permeate the liquid crystal, for example liquid crystal 34, and thereby change its optical properties which would be visible through the transparent tube, or could be measured. Similar action in due course will be evidenced by crystals 35 and 36 vertically disposed from crystal 34. Consequently, the liquid crystals can be used to indicate absorbent effectiveness, and visually show when regeneration or replacement should take place.

The cholesteric liquid crystals as such can be employed as the packing for a gas chromatograph column. This is possible for gases to permeate and diffuse through each crystal in a distinct manner. This property permits gas resolution; and the conditions at all times in the column would be directly observable because of the light scattering effects accompanying the diffusion.

In another contemplated use for the present invention, a cholesteric liquid crystal would be disposed within a controlled atmosphere reaction zone. If the reaction to be carried out were, for example, to be accomplished in the absence of oxygen or air, a liquid crystal particularly sensitive thereto could be used. Upon observing changes, if any, in the liquid crystal an operator would immediately know if his conditions of oxygen concentration were no longer tolerable. He could accordingly take appropriate action. Where this system is used in connection with a vacuum pump, a photocell can be focused on the crystal and be adapted to start the pump when the crystal indicated an undesirable oxygen concentration. For example a mixture of 30 weight percent of cholesteryl eleosterate, 20 weight percent of cholesteryl nonanoate and 50 weight percent cholesteryl oleyl carbonate, which is red at 24° C., would change to a blue color upon absorption of oxygen. A typical reaction in which such a system may be particularly useful is that in which organo-metallic compounds, such as an alkyl lithium, are involved. Numerous similar applications are possible in view of the great number of controlled atmosphere reactions and processes that are presently practiced. As other control examples, it is noted that very small amounts of gaseous hydrogen chloride convert, at about 25° C., a cholesteric liquid crystal composed of 10 weight percent of cholesteryl 3-beta-amine, 10 weight percent of cholesteryl nonanoate and 80 weight percent of cholesteryl oleyl carbonate from blue to red. Similarly the presence of ammonia at room temperature is indicated by a substantial blue color in a liquid crystal composed, by weight, of 20 percent of chloroformate, 60 percent of cholesteryl oleyl carbonate and 20 percent of cholesteryl nonanoate.

Another example of the invention was: A liquid crystal was made from equal parts by weight of cholesteryl acetate and cholesteryl benzoate. At room temperature in ordinary light, a 10 micron thick film of this crystal was red. Benzene vapors changed it to blue. Chloroform vapors deepened its red color. Trichloroethylene caused a change to blue.

The optical property most frequently used to observe change (and therefore the presence of an unknown) in a cholesteric liquid crystal has been color. A change in color, of course, is evidence of a change in the scattering characteristics of the cholesteric liquid crystal. The cholesteric phase exists in a balance of short-range van der Waals and longer range dipole interaction forces. The presence of any foreign material, e.g., a vapor, in the cholesteric liquid crystal affects the interaction of those forces and thus the scattering characteristics of the resulting material. For the same reasons, other optical properties are similarly affected, such as optical rotation, shift of circular dichroism, birefringence, and the like, and changes in those properties can be used in the analysis system. Conventional optical instruments, recorders and the like, such as a photomultiplier, a photocell and so on can be used also to read out the detector in addition to direct visual observation. These may indeed be necessary for remote operations.

Mixtures of compounds also can be used. For example, one such mixture was 45 percent of cholesteryl acetate and 55 percent of cholesteryl benzoate. It had a deep red color at room temperature. The composition of this mixture was varied in five percent steps in both directions. It was found that the color was shifted further toward the red for either direction of composition change. Other mixtures were 50 percent each of cholesteryl acetate and cholesteryl cinnamate; cholesteryl cinnamate and cholesteryl benzoate; cholesteryl palmitate and cholesteryl acetate; cholesteryl palmitate and cholesteryl benzoate; cholesteryl chloroformate and cholesteryl palmitate; cholesteryl chloroformate and cholesteryl acetate; cholesteryl chloroformate and cholesteryl benzoate.

In FIG. 7 there are plotted data obtained on a cholesteryl liquid crystal varied by the presence of a small amount of different commercial oils. The various liquid crystals were illuminated with a helium lamp. The color of maximum reflected intensity, corresponding to the strong spectral lines of helium, was observed at various temperatures and plotted for each system. The base cholesteric liquid crystal in all instances was, by weight, 20 parts of cholesteryl propionate and 80 parts of cholesteryl nonanoate. Data for the first (top) curve were obtained on that mixture free of the oils. Then a crystal was formed by adding 5 parts by weight of oleic acid to the 20:80 mixture of the propionate and nonanoate, and pouring to a substrate in the usual manner. The third mixture was made by adding 5 parts of acodar (commercial oil with high percentage of free fatty acids) to the base mixture. Number 4 was 5 parts of coconut oil and 100 parts of the base. Similarly, 5 parts of corn oil, of tall oil, of triolen and of methyl oleate were used with base mixes to provide, respectively, the 5th through 8th liquid crystals. Temperature-wave length data were taken on each and plotted. It is to be noted that FIG. 7 is substantially to scale, and direct reading can be made from it.

The curves of FIG. 7 show many of the unique characteristics of the discovery. The substantial effect of temperature on any of the given crystals is plain. The unique effect of any of the additives in the same crystal also is plain, and shows at once that these materials, which have some chemical similarity, can be detected and distinguished. For example, if any of these materials is known to be present in the base crystal mixture, temperature scanning to give a characteristic color will immediately show which it is. Or at constant temperature, the maximum reflection of helium light can be noted, thereby showing which additive is involved. Thus if maximum reflectance of the crystal is red at 26° C., the additive is coconut oil, while if, at the same temperature, it is yellow, the curves show it to be corn oil.

Further a constant temperature line can be projected across this graph and the sharply differing colors noted for several compositions. For example, the 26° C. line crosses the curves for mixtures 4, 5, 6, 7 and 8 and the colors indicated will range from red to blue.

The data in FIG. 7 can be replotted. Thus if the ratio of the slopes of any of the curves 2 through 8 to that of curve 1 be replotted versus the wave length, a curve characteristic of the effect of the additive in the particular liquid crystal (the base mixture) is found. Any other amount of that additive in this liquid crystal will give another curve of this type having the same general characteristics as this particular curve. Identification is possible through this, and by standardization procedures quantities can also be recognized. This same procedure of forming standard references can be accomplished with any other cholesteric liquid crystal and with any other series of chemically similar additives with similar results.

Another series of mixtures included equal parts of cholesteryl acetate, cholesteryl benzoate, and cholesteryl palmitate. This gave a very stable liquid crystal, and its color was green at room temperature. The color could be varied toward the red by adding a small amount of cholesteryl benzoate. Cholesteryl cinnamate was added to a mixture of this nature with the result that a highly stable liquid crystal phase was formed which could be shifted to the red by adding more cholesteryl cinnamate. The color of the mixture of cholesteryl acetate, palmitate, and benzoate fell roughly at the wave length of the 5540 A. line of mercury at room temperature. It was found that 30 percent each of cholesteryl acetate, cholesteryl benzoate, cholesteryl palmitate plus 10 percent cholesteryl cinnamate formed a liquid crystal whose color was about that of the sodium D line at room temperature. It was found that by intermediate mixtures any spectral color could be obtained.

The sensitivity of the analysis procedures made possible by this invention is considered utterly remarkable when compared with any other system presently available to the analyst. The data in FIG. 7 show this. Other tests of the invention have further confirmed this unique aspect of the invention. For example, tests with a series of triglycerides provided analogous results to those shown in FIG. 7. In other tests, I have been able to distinguish cis and trans isomerism by the difference in degree of effect produced. In those determinations made to date, cis isomers have been found to produce a greater shift in color or other optical characteristic than the trans configuration of the same chemical compound. Further, a series of tests were made with alcohols of varying chain length in cholesteryl chloroformate and it was observed that where the alkyl moiety therein had an even number of carbon atoms a lesser effect was present on the temperature vs. wave length characteristics than if the chain had an odd number of carbon atoms, thereby adding this additional refinement to the analysis procedures now available. Types of steroids are also distinguishable from one another. Further, differences of a $C_2H_5$ group in a compound have been detected. Indeed, I have noted that even the location of a double bond gives a characterizing result by changing the slope of a temperature vs. wave length curve. It is conceived that refinements will give characteristics as useful as spectographs presently are in the analysis of some materials, but with an ease of practice and an economy that will be of great advantage.

For analysis or detection systems where continuous monitoring is undesirable or not possible, an irreversible detector may be more useful than those of reversible systems. In the irreversible system, interaction of the cholesteric liquid crystal and the unknown occurs bringing about a permanent change in optical properties because, in effect a new cholesteric liquid crystal results from the interaction. The effect on optical properties depends on the specific materials reacted and their concentrations. In this manner, cholesteryl nonanoate, or any cholesterol derivative, can be used to detect free halogens such as chlorine or bromine. Ozone, oxygen and the halogens can be detected and determined by cholesteryl allyl ether or cholesteryl eleostearate.

In the foregoing instances, the mechanism of reaction is presently understood to be primarily that of addition to double bonds and, in some cases, catalysis of polymerization. In addition, it has been found that alcohols and amines can be detected by cholesteryl chloroformate in a reaction that forms a carbonate or urethane.

In any analysis procedure, standardization is practiced to insure reproducibility and that the results achieved can be appropriately interpreted. In this invention, substrates can affect the intensity of a color (dark substrates reflect better) and must be considered to that extent. Temperature in most instances has a striking effect (see FIG. 7), and can bring about a color change or change in other optical property. This can occasionally be utilized to further refine the analysis system. Generally, however, this must merely be noted so that changes resulting will be attributed to the proper influence. A dipole field can affect the dipolar character of cholesterol derivatives. A shear stress applied to a cholesteric liquid crystal can change the optical characteristics. Radiation can affect the chemical constitution thereby providing a different cholesteric liquid crystal and, consequently, different optical properties. The angle of incidence and the character of light used can also be significant. For example, with polarized or unpolarized light, the scattering maximum (50%) is all circularly dichroic at normal incidence, but decreases as the angle of incidence increases. In any of the foregoing instances, no adverse effects will result in any analysis procedure if, for example, the test temperature is the same as that at which the standard was determined, or but a single angle of incidence is used and so on.

From the foregoing discussion, description and data it is evident that the present invention constitutes a unique and highly effective analysis discovery. Its sensitivity can be compared to that of the human nose in scope. Data have shown that with it, changes in concentration on the order of but a few parts per million can be detected, as well as chain characteristics, isomerism and other slight variations in chemical structure. It may be noted that quantities of material used are not critical, and are generally important only for quantitative analysis. However, in the practice of the invention it has been the usual practice to use about one to 50 parts by weight of the unknown per 100 parts of liquid crystal, though other weight ratios could be used as well. When it is considered that a determination can be readily made with very minor amounts of the cholesteric liquid crystal, the economy available with invention becomes apparent.

While the invention has been disclosed with respect to specific materials and conditions it will be evident that changes can be made in it without departing from its scope.

I claim:
1. A method of identifying an unknown material comprising the steps of providing a cholesteric liquid crystal element, contacting the liquid crystal element with said unknown material, and observing a change in an optical property of the cholesteric liquid crystal element in response to the presence of said unknown material.

2. A method of identifying an unknown vapor comprising the steps of obtaining a thin film of cholesteric liquid crystalline material, bringing the unknown vapor into contact with the thin film, and observing a change in an optical property of the liquid crystal in response to the presence of the unknown vapor.

3. A method of identifying an unknown vapor comprising the steps of obtaining a thin film of a material in a cholesteric liquid crystalline phase, exposing the thin film to the vapor whose composition is to be determined and which is at least partially soluble in the thin film, and observing the color change in the thin film in response to the presence of the vapor.

4. A method of identifying an unknown material comprising the steps of mixing a predetermined quantity of the unknown material and a material capable of exhibiting a cholesteric liquid crystal phase with known optical properties, obtaining a film in a cholesteric liquid crystal phase from the resulting mixture and observing a change in optical property in the film from those of the cholesteric liquid crystal in the absence of the added unknown material.

5. A method in accordance with claim 4 in which the unknown in a liquid.

6. A method for identifying an unknown liquid comprising the steps of dissolving a quantity of a material capable of existing in the cholesteric liquid phase with known optical properties in a solvent therefor, adding a quantity of the unknown liquid to the resultant solution to produce a new solution, obtaining a film in a cholesteric liquid crystal phase from the new solution and observing the change from the known optical property in a film obtained from the resultant solution.

7. A method for identifying an unknown liquid comprising the steps of dissolving a predetermined quantity of a material capable of existing in the cholesteric liquid phase with known optical properties in a solvent therefor, adding a measured quantity of the unknown liquid to the resultant solution to produce a new solution, obtaining a film of the new solution in a cholesteric liquid crystal phase, adding an additional measured quantity of the unknown liquid to the said new solution to obtain a third solution, obtaining a second film of the third solution in cholesteric liquid crystal phase, observing the optical properties of the two films and comparing the properties found with standards to identify the unknown liquid.

8. A method for identifying an unknown solid comprising the steps of dissolving a quantity of a material capable of existing in the cholesteric liquid phase with known optical properties in a solvent therefor, adding a quantity of the unknown solid to the resultant solution to produce a new solution, obtaining a film in a cholesteric liquid crystal phase from the new solution and observing a change in color in the film from the new solution compared to the color of a film obtained from the resultant solution.

9. A method for identifying an unknown solid comprising the steps of dissolving a predetermined quantity of a material capable of existing in the cholesteric liquid phase with known optical properties in a solvent therefor, adding a measured quantity of the unknown solid to the resultant solution to produce a new solution, obtaining a film in a cholesteric liquid crystal phase from a portion of the new solution, adding an additional measured quantity of the unknown solid to the said new solution to obtain a third solution, obtaining a film in a cholesteric liquid crystal phase from the third solution, observing the optical properties of the two films and comparing the properties found with standards to identify the unknown solid.

10. In combination: apparatus comprising a column having gas inlet and gas outlet means to said column, a cholesteric liquid crystal disposed in the column intermediate the inlet and outlet means, said column being capable of containing a mass of solid absorbent, the liquid crystal being capable of solubilizing gas to be absorbed by the solid absorbent, whereby the passage of gas through the column to at least the liquid crystal therein can be observed by change in optical properties in the cholesteric liquid crystal.

11. An article for the analysis of a material comprising: a substrate; a plurality of sensitive elements disposed on said substrate, each of said sensitive elements comprising a different material, each such different material being in a cholesteric liquid crystalline phase and each exhibiting a sensitivity by which the color of said sensitive element changes upon the solution of a material therein, the color changes of different ones of said plurality of sensitive elements being dissimilar so that exposure to a material to be analyzed produces a color pattern in said plurality of sensitive elements that assists in determining the composition of said material.

12. An article for the analysis of a material comprising: a substrate; an array of a plurality of sensitive elements disposed on said substrate so as to permit radiation and molecules from the surrounding atmosphere to impinge thereon; said substrate being non-reactive and insoluble with said sensitive elements; each of said sensitive elements comprising a different material, each such different material being in a cholesteric liquid crystalline phase in a given temperature range and each exhibiting a sensitivity by which the color of said sensitive element changes in a predictable and reversible manner upon the solution of a material therein, the color changes of different ones of said plurality of sensitive elements being dissimilar so that upon exposure of said array to a material to be analyzed while in said temperature range a color pattern is formed in said array that assists in determining the composition of said material.

13. A detector element having a cholesteric liquid crystalline phase comprising a mixture of compounds, said mixture containing an alkenyl carbonate of a compound selected from the group consisting of cholesterol and cholestanol.

14. The detector element of claim 13 wherein said carbonate is cholesteryl oleyl carbonate.

15. The detector element of claim 13 wherein said carbonate is cholestanyl oleyl carbonate.

16. An analytical device comprising a substrate, a plurality of distinct sensitive detector elements disposed on said substrate, each of said elements containing a material in the cholesteric liquid crystalline phase.

17. The device of claim 16 wherein said material is a mixture of compounds, said mixture containing an alkenyl carbonate of a compound selected from the group consisting of cholesterol and cholestanol.

18. The device of claim 17 wherein said carbonate is cholesteryl oleyl carbonate.

19. The device of claim 17 wherein said carbonate is cholestanyl oleyl carbonate.

References Cited

UNITED STATES PATENTS

| | | | |
|---|---|---|---|
| 3,114,836 | 12/1963 | Fergason et al. | 23—230 |
| 2,785,057 | 3/1957 | Schwab et al. | 23—253 |
| 3,006,735 | 10/1961 | Jordan | 23—253 |
| 3,215,498 | 11/1965 | Schlitt | 23—232 |

OTHER REFERENCES

Peters, J. P. and Van Slyke, D. D.: Quantitative Clinical Chemistry, The Williams and Wilkins Co., Baltimore, 1963, p. 509 relied on.

Gray, G. W.: Molecular Structure and the Properties of Liquid Crystals, Academic Press, New York, 1962, pp. 6, 11, 12, 47, 193, 194 relied on.

International Critical Tables: vol. I, pp. 314–320 Q199 N32 Mar. 10, 1927.

Merck Index: 7th ed., Merck & Co. Inc. RS 356 M524 1960 c. 36.

Whitaker's Five-Year Cumulative Book list 1958–1962: J. Whitaker & Sons, London, 1963.

Gilman, H.: Organic Chemistry, An Advanced Treatise, vol. 2, J. Wiley & Sons, Inc., New York, 1938 pp. 1271–1272 relied on.

Dewey, B. T. & Gelman, A. H.: Ind. & Eng. Chemistry, Anal. Ed. 14, 361 (1942).

Kirchner, J. G., Miller, J. M., and Keller, G. J.: Anal. Chemistry 23, 420 (1951).

Lederer, E., and Lederer, M.: Chromatography, A Review of Principles and Applications, Elsevier Pub. Co., New York, 1957, pp. 172–173 relied on.

MORRIS O. WOLK, *Primary Examiner.*

R. M. REESE, *Assistant Examiner.*